United States Patent
Subburaj et al.

(10) Patent No.: US 8,693,598 B2
(45) Date of Patent: Apr. 8, 2014

(54) RADIO RECEIVER WITH MITIGATION MODULES AND MIXERS WITH PHASE COMPENSATION

(75) Inventors: Karthik Subburaj, Bangalore (IN); Jawaharlal Tangudu, Bangalore (IN); Raghu Ganesan, Bangalore (IN); Karthik Ramasubramanian, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 258 days.

(21) Appl. No.: 13/204,618

(22) Filed: Aug. 5, 2011

(65) Prior Publication Data

US 2013/0034127 A1 Feb. 7, 2013

(51) Int. Cl.
*H03D 1/04* (2006.01)

(52) U.S. Cl.
USPC .......................................................... 375/346

(58) Field of Classification Search
USPC ......................................... 375/350, 147, 346
See application file for complete search history.

(56) References Cited

U.S. PATENT DOCUMENTS

| | | | |
|---|---|---|---|
| 6,344,871 B1* | 2/2002 | Liu et al. ......................... 348/21 |
| 2003/0112905 A1* | 6/2003 | Heinzl et al. .................. 375/350 |
| 2005/0273482 A1* | 12/2005 | Moore .......................... 708/300 |
| 2007/0153878 A1* | 7/2007 | Filipovic ....................... 375/147 |
| 2008/0240315 A1* | 10/2008 | De Mey et al. ............... 375/350 |
| 2012/0142300 A1* | 6/2012 | Herzinger et al. ............ 455/293 |

* cited by examiner

*Primary Examiner* — Jaison Joseph (74) *Attorney, Agent, or Firm* — Lawrence J. Bassuk; Wade J. Brady, III; Frederick J. Telecky, Jr.

(57) ABSTRACT

Example embodiments of the systems and methods of dynamic spur mitigation for wireless receivers disclosed herein comprise one or more of a detection module for detecting the presence of a spur and a determination of its frequency, a complex notch filter chain, and a frequency locked loop which ensures that the input spur is notch filtered even if it drifts after detection. When a spur is detected, the frequency of the tone is determined. The spur is then filtered, for example using a phase rotator and a DC separator. The phase rotation is removed in a subsequent stage. The non-DC component from the DC separator is used to track the spur to compensate for any shifting or drifting in the spur.

1 Claim, 8 Drawing Sheets

RADIO RECEIVER WITH MITIGATION MODULES AND MIXERS WITH PHASE COMPENSATION

TECHNICAL FIELD

The present disclosure is generally related to wireless systems and, more particularly, is related to wireless receivers.

BACKGROUND

Wireless receivers are affected by interference in the form of spurious tones. These tones may be caused by other wireless receivers co-existing in the cell-phone platform or other noise sources. Spurious tones are normally caused by phase/frequency detector and divider circuits in the feedback control path. Spurious tones may be defined as systematic timing fluctuations in an oscillator waveform. In the time domain, the presence of systematic timing fluctuations in an oscillation waveform represents a periodic timing error. In the frequency domain, it manifests as the undesired tones in the frequency spectrum. Ideally, an oscillator output spectrum centers at a single frequency with no spurious tones. In reality, the presence of spurious tones causes other frequency components to appear in the oscillator output spectrum. Spurious tones degrade the overall sensitivity of the receiver. There are heretofore unaddressed needs in reducing spurious tones with previous solutions.

SUMMARY

Example embodiments of the present disclosure provide systems of dynamic spur mitigation for wireless receivers. Briefly described, in architecture, one example embodiment of the system, among others, can be implemented as follows: a presence module configured to monitor an input spectrum and detect the presence of a spurious tone; a frequency module configured to determine the frequency of the spurious tone; and a DC separator configured to filter the spurious tone at substantially zero Hz and to remove phase rotation.

Embodiments of the present disclosure can also be viewed as providing methods of dynamic spur mitigation for wireless receivers. In this regard, one embodiment of such a method, among others, can be broadly summarized by the following steps: detecting a presence of a spurious tone; determining a frequency of the spurious tone; filtering the spurious tone at substantially zero Hz with a DC separator; and removing phase rotation.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

One particular example of a wireless receiver is a Global Positioning System (GPS) and Global Navigation Satellite System (GLONASS) receiver. This receiver may receive both GPS and GLONASS signals on a single antenna and process GPS and GLONASS signals separately. Hereafter, GPS may refer to GPS only, GPS and GLONASS, or a GLONASS only receiver. GPS signals are very low power (−130 dBm to −160 dBm). Spurious tones in the GPS signal band may cause false detection of satellites or totally prevent a location determination. Other radios (for example, frequency modulation (FM) and bluetooth (BT)) on the same device may cause spurious tones in the GPS band. In one example, the GPS receiver has 40 MHz receive bandwidth, so there is a high probability that one or more spurious tones falls within this band. Additionally, the frequency of the spurious tones may vary with time due to a drifting crystal or a drifting synthesizer, for example. Spurs or spurious tones may be of a single static frequency, a dynamically drifting frequency, or narrow band interferers for example.

In the previous solutions, a fast Fourier transform (FFT) is performed on the output of an analog to digital output of the receiver to detect presence and frequency of the spur. A programmable notch filter is then used to remove the spur. An example transfer function of such a notch filter is:

$$H(z)=(1-2\cos\omega_o z^{-1}+z^{-2})/(1-2R\cos\omega_o z^{-1}+R^2 z^{-2})$$

where R and $R^2$ are constants that determine the notch filter bandwidth (0.9->0.99->0.999 corresponds to lower bandwidth) and $\cos\omega_o$ programs the notch filter frequency. However, to reduce GPS signal energy loss, the notch filter bandwidth is a minimum value (for example 40 Hz for 50 dB attenuation). In order to accurately remove only the spur frequency and to minimize loss of signal energy, the parameters R, $R^2$, $\cos\omega_o$, etc. are represented with a relatively large number of bits, which cause very high computational data paths and large silicon area for spur mitigation. Thus, previous solutions use a large data path and are not useful in spur mitigation. A potential downfall of these previous solutions involves not attenuating a moving spur while also removing some signal energy.

The disclosed systems and methods of dynamic spur mitigation for wireless receivers offer a novel and efficient architecture of spur tracking and notch filtering, which enable filtering out multiple spurs. Additionally, the frequency of the spurs may be tracked using a frequency locked loop (FLL). In an example embodiment, the filtering is performed with a fixed DC (0 Hz) separator after frequency translation of the spur to DC. This enables the frequency translator to be controlled by the loop filter of the FLL, while the DC error feedback signal (DC-component) from the DC separator may be the error feedback signal of the FLL with an improved spur/noise ratio for better sensitivity to low magnitude spurs.

Figure 1:
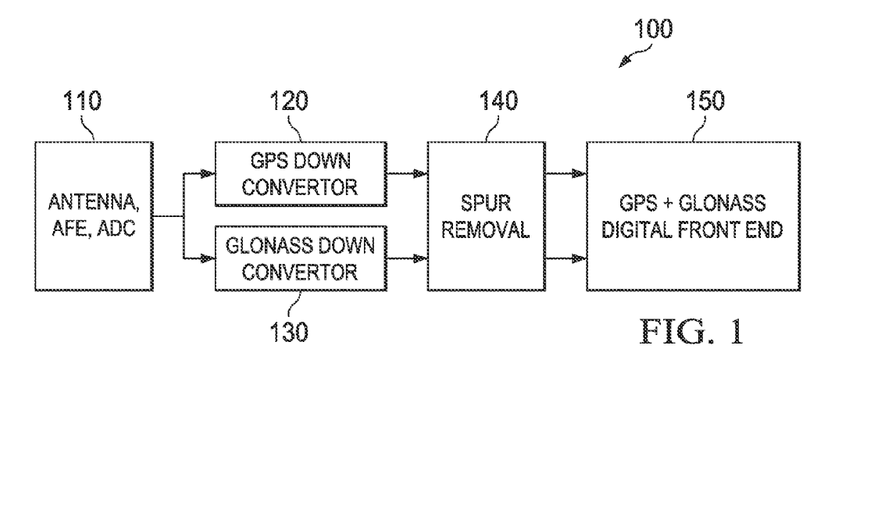
FIG. 1 is a block diagram of an example embodiment of a typical wireless receiver front end.

FIG. 1 provides typical receiver front end 100. Although the systems and methods disclosed herein are described in terms of a GPS/GLONASS receiver, they are also applicable to other wireless receivers. In FIG. 1, the GPS and the GLONASS digital front-ends receive a signal on antenna 110. In an example implementation, the received signal has a bandwidth of 16 MHz. The receiver of FIG. 1 is configured such that the antenna receives both GPS and GLONASS signals on the same antenna. The output of the antenna is frequency translated to form a complex signal with a spectrum comprising a GPS signal at the center of the spectrum, and to form another complex spectrum which has a GLONASS signal at the center of the spectrum. The outputs of GPS down converter 120 and GLONASS down converter 130 are fed into spur removal block 140 for spur removal and then to digital front end 150.

Example embodiments of the systems and methods of dynamic spur mitigation for wireless receivers disclosed herein may comprise one or more of a detection module for detecting the presence of a spur and a determination of its frequency, a complex notch filter chain, and a frequency locked loop which ensures that the input spur is notch filtered even if it drifts after detection. First a spurious tone is detected. In an example embodiment, the input data is processed to determine if one or more spurious tones are present. When a spur is detected, the frequency of the tone is determined. Then the input spectrum is shifted such that the spur is at DC. In an example embodiment, the phase of each data sample is changed by varying amounts, which are equal to the value obtained by integrating and accumulating the spur's frequency from an initial time reference (such as time zero).

Each module is configured to cancel out any phase modification imparted by the previous stage before imparting its own phase modification. Both canceling and imparting modification of phase may be performed in a single step. This helps in avoiding extra latency in the signal path and complexity or silicon area involved in restoring the data spectrum to its original frequency after spur notching in each stage. The spur is then filtered, for example with a DC separator. A frequency lock loop is used to track the spur to compensate for any shifting or drifting in the spur. In an example embodiment, a final phase shifter may cancel the phase modification of the last stage in the chain. A low complexity architecture uses a DC separator and an efficient mixer with phase compensation with an FLL to track spurious tones. Phase rotation info may be passed to be cancelled by downstream units, making it efficient and cascade-able. FLL based tracking of spurs—instead of tracking using repeated FFT of an ADC output—increases efficiency.

In identifying spurs in an example embodiment, first a coarse search is performed by performing a number of iterations of a fast fourier transform (FFT) algorithm on the input ADC data. The number of interations may be programmable. The outputs of the FFT may be non-coherently accumulated (NCA) in an NCA memory. In an example embodiment, the FFT outputs (I and Q) are available in 2048 locations FFT memory (in a 12 bit I, 12 bit Q non-limiting example). An example non-coherent accumulation involves finding $I^2+Q^2$ or $\sqrt{I^2+Q^2}$ for each of the 2048 I,Q outputs of each FFT iteration and accumulating that quantity into a 2048 location memory. The NCA outputs may then be available in 2048 locations NCA memory (in a 20 bit positive magnitude non-limiting example).

In an example embodiment, the NCA output array is processed to identify spurs in the power spectrum of the received spectra, for example, GPS and GLONASS. In an example implementation in which Fs=16 MHz and NFFT=2048, the frequency resolution is 8 KHz. A finer search may be used to identify the frequency of the spur more accurately by decimating the input data before performing the FFT similar to the method performed in the coarse search. A processing means may identify samples which have higher power than other frequency components. To identify spurs, which are different from those already being tracked, a fine search may be performed with an additional FFT algorithm. The output may be interpolated to find an accurate frequency of additional spurs.

In an example implementation, a mitigation unit top is used to mitigate each spur. The spur frequency, as previously determined, is programmed into a free mitigation unit top of a plurality of mitigation unit tops. In an example embodiment of a dual GPS-GLONASS system, the mitigation core of each of the mitigation unit tops may be deployed in either the GPS or the GLONASS path. For example, if there are four mitigation unit tops with one mitigation core each, they can mitigate four GPS and zero GLONASS spurs, three GPS and one GLONASS spurs, two GPS and two GLONASS spurs, one GPS and three GLONASS spurs, or zero GPS and four GLONASS spurs depending on where spurs are found. In an alternative embodiment, the mitigation cores could be dedicated, for example, split to mitigate two GPS and two GLONASS spurs. However, in this implementation, if three GPS and zero GLONASS spurs are present, one GPS spur will remain unmitigated though two mitigation core resources remain idle.

Figure 2:
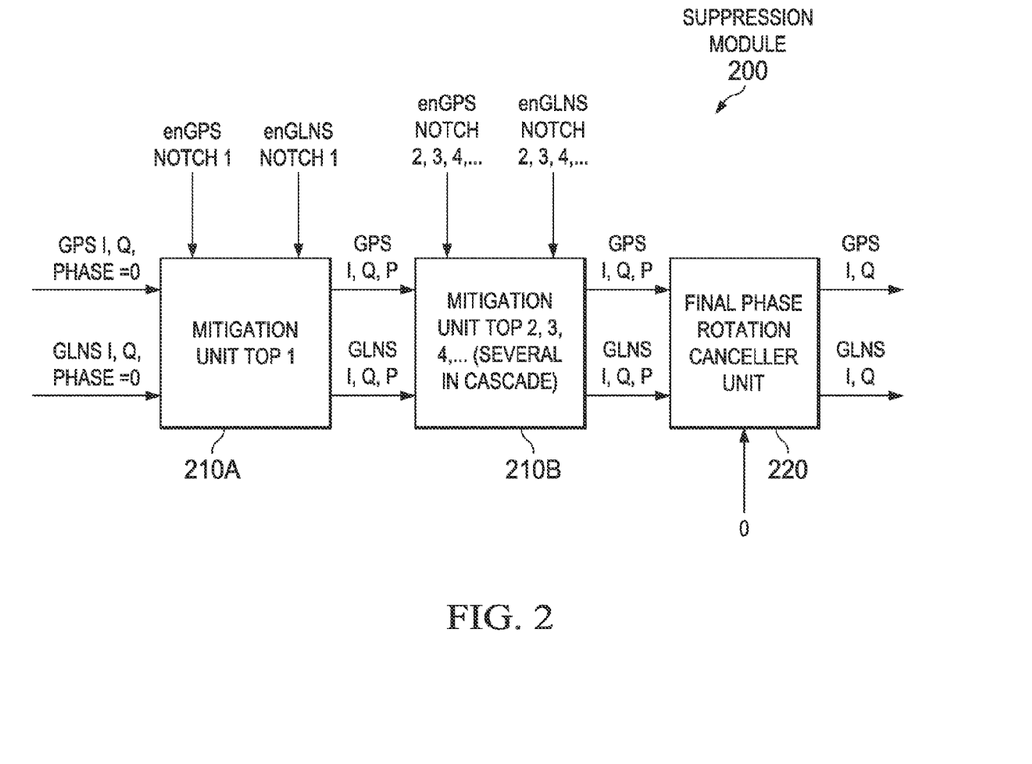
FIG. 2 is a block diagram of an example embodiment of a spur suppression module for wireless receivers.

An example embodiment of spur suppression module 200 is provided in FIG. 2. In an example embodiment multiple mitigation unit tops 210A, 210B are connected in a cascaded configuration. Only two mitigation unit tops are shown in FIG. 2, but any number of mitigation unit tops may be implemented, depending on the maximum number of spurious tones to be filtered. Each mitigation unit top 210A, 210B, along with removing the spur from the signal it is programmed may impart phase rotation on that signal. That phase rotation or modification information is passed on to the next mitigation unit top to remove phase rotation or modification imparted by the previous stage before processing the next spur. Final phase rotation canceller 220 removes the residual phase rotation using the phase rotations or modification information from the last unit in the chain of mitigation unit tops.

Figure 2A:
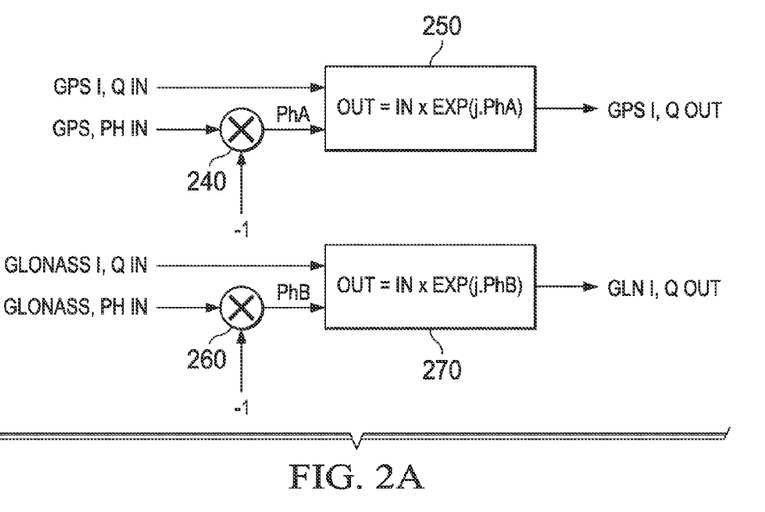
FIG. 2A is a block diagram of an example embodiment of a final phase rotation canceller in the spur suppression module for wireless receivers of FIG. 2.

FIG. 2A provides a block diagram of final phase rotation canceller 220. In the GPS signal path, the phase of the GPS signal is multiplied by −1 in multiplier 240. The GPS I, Q input is then multiplied in block 250 by a complex exponential function of the output of multiplier 240. A complex exponential function is $\exp(j\Theta)=\cos(\Theta)+j*\sin(\Theta)$, where j is sqrt (−1). Likewise, in the GLONASS signal path, the phase of the GLONASS signal is multiplied by −1 in multiplier 260. The GLONASS I, Q input is then multiplied in block 270 by an exponential function of the output of multiplier 260. Multiplier blocks 250 and 270 may be implemented, as non-limiting examples, by complex multipliers or by using coordinate rotation digital computer (CORDIC) based phase rotations. In each of the signal paths, the phase rotation of the previous mitigation unit tops is remediated.

Figure 3:
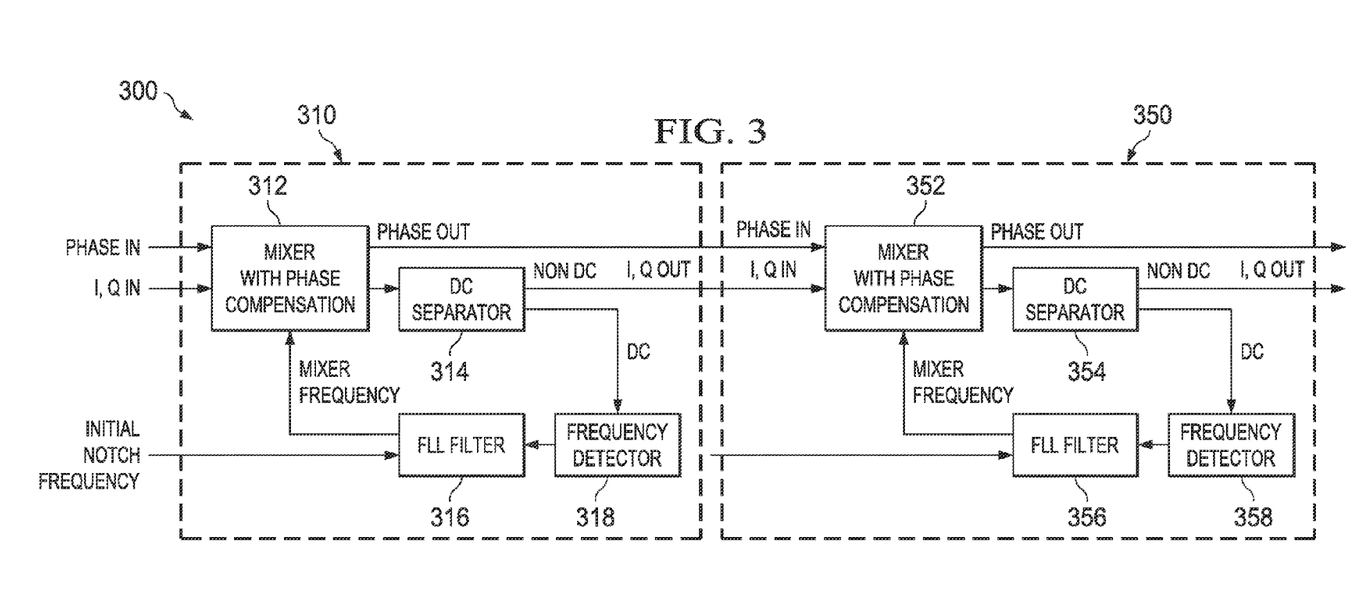
FIG. 3 is a block diagram of an example embodiment of a mitigation core of the mitigation unit top of FIG. 3A.
Figure 3A:
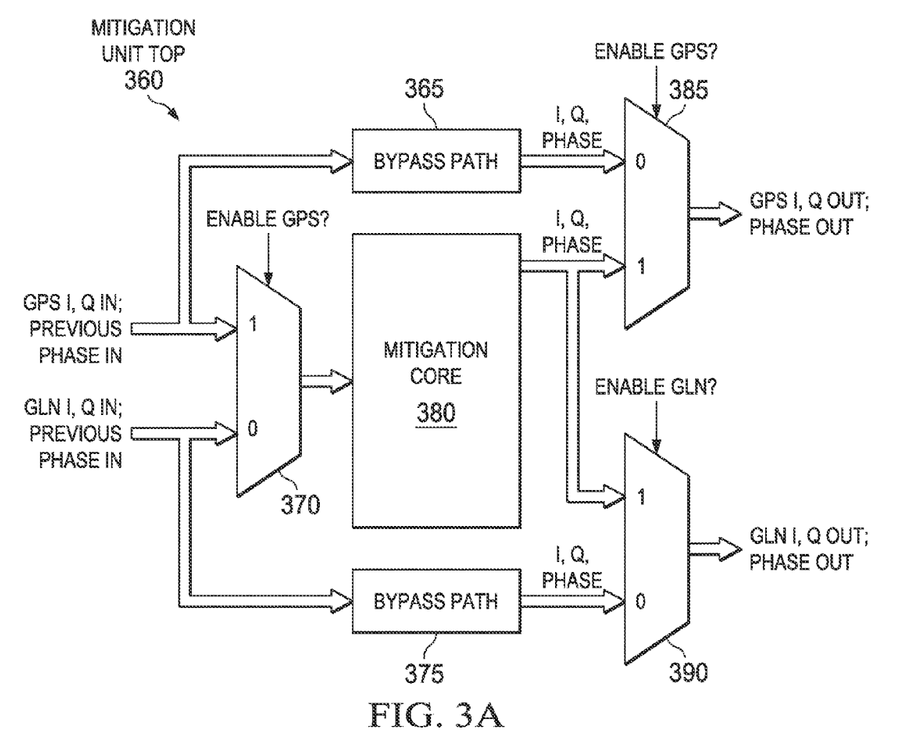
FIG. 3A is a block diagram of an example embodiment of the mitigation unit top of FIG. 2.

FIG. 3A provides an example embodiment of mitigation unit top circuit 360. In an example embodiment, a bypass path comprises a series of delay registers whose total delay is equal to the normal path delay. This bypass scheme may serve to preserve the total delay in the GPS and GLONASS data paths irrespective of whether a spur is being filtered in that path or not. The bypass path may inhibit jumps in the perceived delay in the GPS and GLONASS signals when they start to undergo spur filtering and when the spur filtering is inhibited. This may be crucial in GPS and GLONASS receivers in which delay in the signal may carry significant information. Bypass path circuit 360 may comprise switch 370, GPS bypass path 365, GLONASS bypass path 375, mitigation core 380, switch 385, and switch 390. Switch 370 determines whether the I,Q input proceeds to a bypass path or into mitigation core 380. If switch 370 is closed, the I,Q input is filtered in mitigation core 380 and the output and phase rotation information is forwarded out through switch 385 or switch 390. If switch 370 is open, no filtering is performed and the I,Q, input proceeds through one of bypass path 365 and bypass path 375.

FIG. 3 provides block diagram 300 of an example embodiment of two consecutive cascaded mitigation unit tops of the spur suppression module of FIG. 2. In order to explain the mitigation cores of the mitigation unit top in detail, the bypass paths and the bypass switches of the mitigation unit top are not explicitly shown. Only the mitigation core is shown and the corresponding bypass switches before and after each mitigation core are deemed to be present. First mitigation core 310 of first mitigation unit top 210A comprises mixer 312, DC separator 314, FLL filter 316 and frequency detector 318. Each mitigation core 310, 350 is programmed to remove a spurious tone. Mixer 312 is configured to shift input I,Q data such that a first spur falls at DC. DC separator 314 extracts the DC component of the output of mixer 312 and sends out the rest of the signal. The DC component of the output corresponds to the spur as a substantially zero Hz signal if the spur frequency output of the frequency lock loop is accurate. When the frequency of the spurious tone is at the notch frequency, the DC component is at 0 Hz. However, if the DC component is not at 0 Hz, there is a frequency error, where $F_{err}$=Spur Freq–Notch Freq. In an example embodiment, freq detector 318 determines the frequency value of this non-zero frequency and configures FLL loop filter 316. The output of FLL loop filter 316 controls the notch frequency of mixer 312. The spur frequency as determined by the fine frequency search step may be used to initialize the output of FLL loop filter 316 to initialize the spur tracking. This implements FLL tracking of the first spurious tone should it drift or move from DC. Though not explicitly shown in FIG. 3, the mixer's output phase signal may be delayed by a duration equal to the latency in the DC separator before it is sent to the next stage for phase cancellation.

In an example embodiment, the phase and I,Q outputs of mitigation core 310 are fed through the appropriate bypass switches into the subsequent mitigation unit top and forwarded to mitigation core 350 through the by pass switches in that mitigation unit top. In an example embodiment, mitigation core 310 filters a spurious tone at a first frequency and mitigation core 350 filters a spurious tone at a second frequency. Mixer 352 is configured to shift input I,Q data such that a second spur falls at DC. DC separator 354 extracts the DC component of the output of mixer 352 and sends out the rest of the signal. In an example embodiment, freq detector 358 determines the frequency value of any non-zero frequency and configures FLL filter 356 with an initial notch frequency input and the output of frequency detector 358, which controls the notch frequency of mixer 352. This implements FLL tracking of the second spurious tone should it drift or move from DC. Note that in an example embodiment, mitigation cores 310 and 350 are identical to each other. Two mitigation cores are shown in FIG. 3, but any number of mitigation cores may be used depending on the number of spurs that are to be filtered. In an example embodiment, all the mitigation cores are identical to mitigation core 310.

Figure 4:
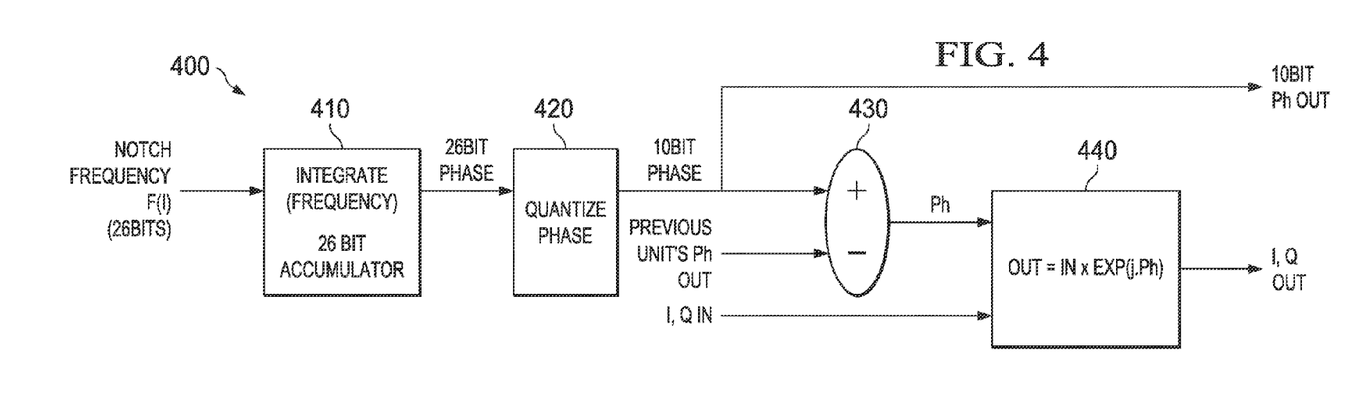
FIG. 4 is a block diagram of an example embodiment of the mixer with phase compensation of FIG. 3.

FIG. 4 provides block diagram 400 of an example embodiment of mixer with phase compensation 312 of FIG. 3. The example embodiment of FIG. 4 comprises accumulator 410, quantization module 420, adder 430, and phase rotator complex multiplier 440. The notch frequency of a first mitigation core is integrated by accumulator 410. In an example implementation, accumulator 410 has a 26 bit resolution. For 1 Hz accuracy when using a 64 MHz ADC, only accumulator 410 is to be 26 bits. The remaining logic may be implemented with 10 bit resolution. The resultant phase from accumulator 410 is quantized in quantization module 420. In an example implementation, the 26 bit output of accumulator 410 is quantized to a 10 bit phase output in quantization module 420. This high amount of quantization does not impact the accuracy of the spur cancellation as the quantization in this example embodiment is on the phase of the spur and not the frequency of the spur. From this 10 bit phase output, the phase rotation imparted on I,Q data sample by a previous mitigation core is removed by subtraction in adder 430. If the mitigation core is in the first mitigation top unit in the spur suppression module of FIG. 2, then zero is subtracted. The I,Q sample is then rotated by the resultant phase. The 10 bit phase rotation output from quantization module 420 is sent to the next mitigation core in the chain for removal. This may obviate the use of phase rotation cancellers to cancel the phase rotation imparted by one stage by a dedicated multiplier after each stage, thereby reducing the complexity or silicon area of the total solution. Complex multiplier 440 may be implemented, as non-limiting examples, by complex mulitpliers, or by using coordinate rotation digital computer (CORDIC) based phase rotations.

Figure 5:
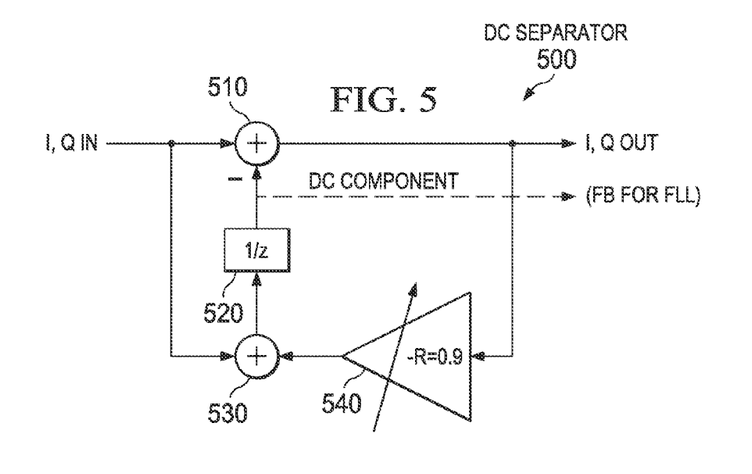
FIG. 5 is a block diagram of an example embodiment of the DC separator of FIG. 3A.

FIG. 5 provides block diagram 500 of an example embodiment of DC separator 314, 354. The filter is configured to split input I,Q into the DC component of the input (which is the feedback signal for the FLL) and the remaining signal, such that (I,Q out=I,Q in–DC). The DC component is the output of a low-pass filter transfer function which improves the spur/noise ratio. This enables tracking weak spurs even in the presence of a large amount of noise due to the high amount of noise filtering. Weaker spurs (for example, –145 to –150 dBm) may also be tracked. In an example embodiment, transform block 520 represents a pair of delay registers (one for I and one for Q). The input to this delay register is the output of adder 530. The input to adder 530 is the I,Q input for the filter stage and the output of attenuator 540. Attenuator 540 attenuates the output of adder 510. The transfer function of the first order filter of FIG. 5 is $(z-1)/(z-R)$ where R is the attenuation of attenuator 540. The closer R is to 1 (but lesser than 1), the narrower the DC separator's bandwidth. In an example embodiment, a 5 Hz drift in the spur frequency will result in the "DC component" becoming a 5 Hz wave. The frequency detector can find this frequency and drive a FLL filter.

Figure 6:
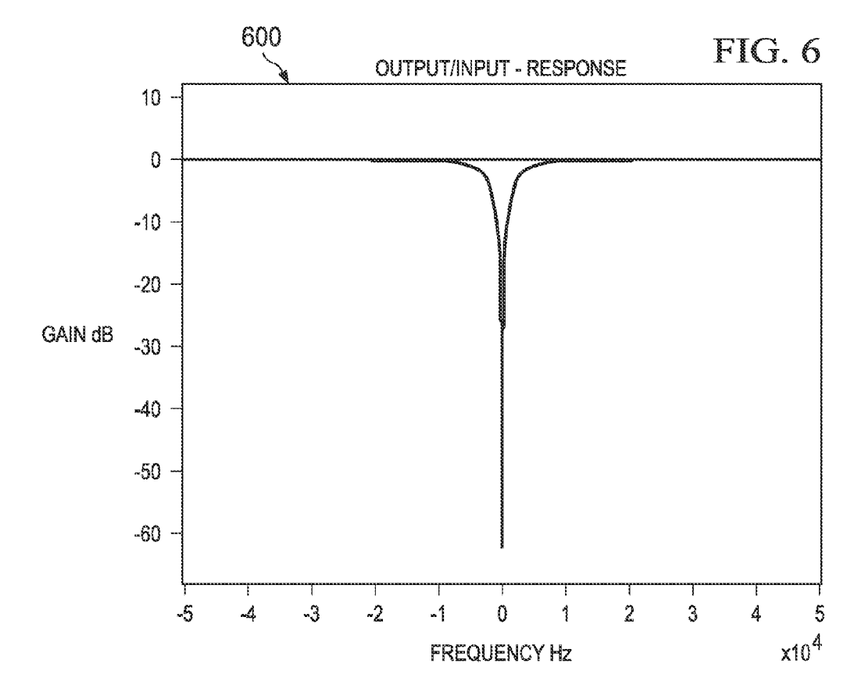
FIG. 6 is a signal diagram of an example embodiment of the DC separator of FIG. 5.

FIG. 6 provides graph 600 of the output/input response of the DC separator. The DC separator center frequency is at zero Hz with an attenuation of 60 dB. The spur is suppressed before the data is sent to the rest of the receiver when compared to other frequency components, which are not suppressed.

Figure 7:
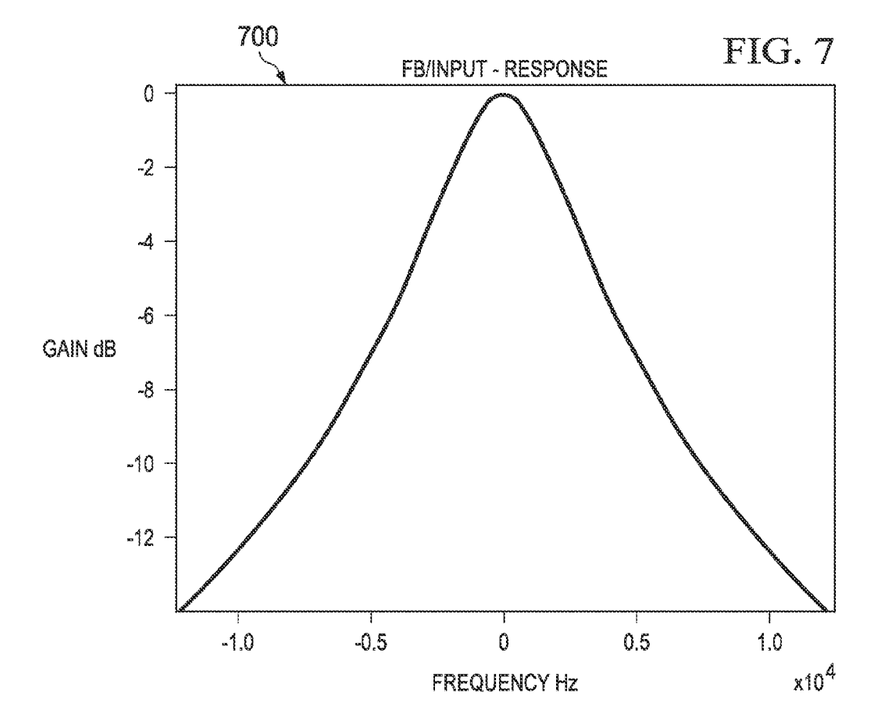
FIG. 7 is a signal diagram of an example embodiment of the DC separator of FIG. 5.
Figure 8:
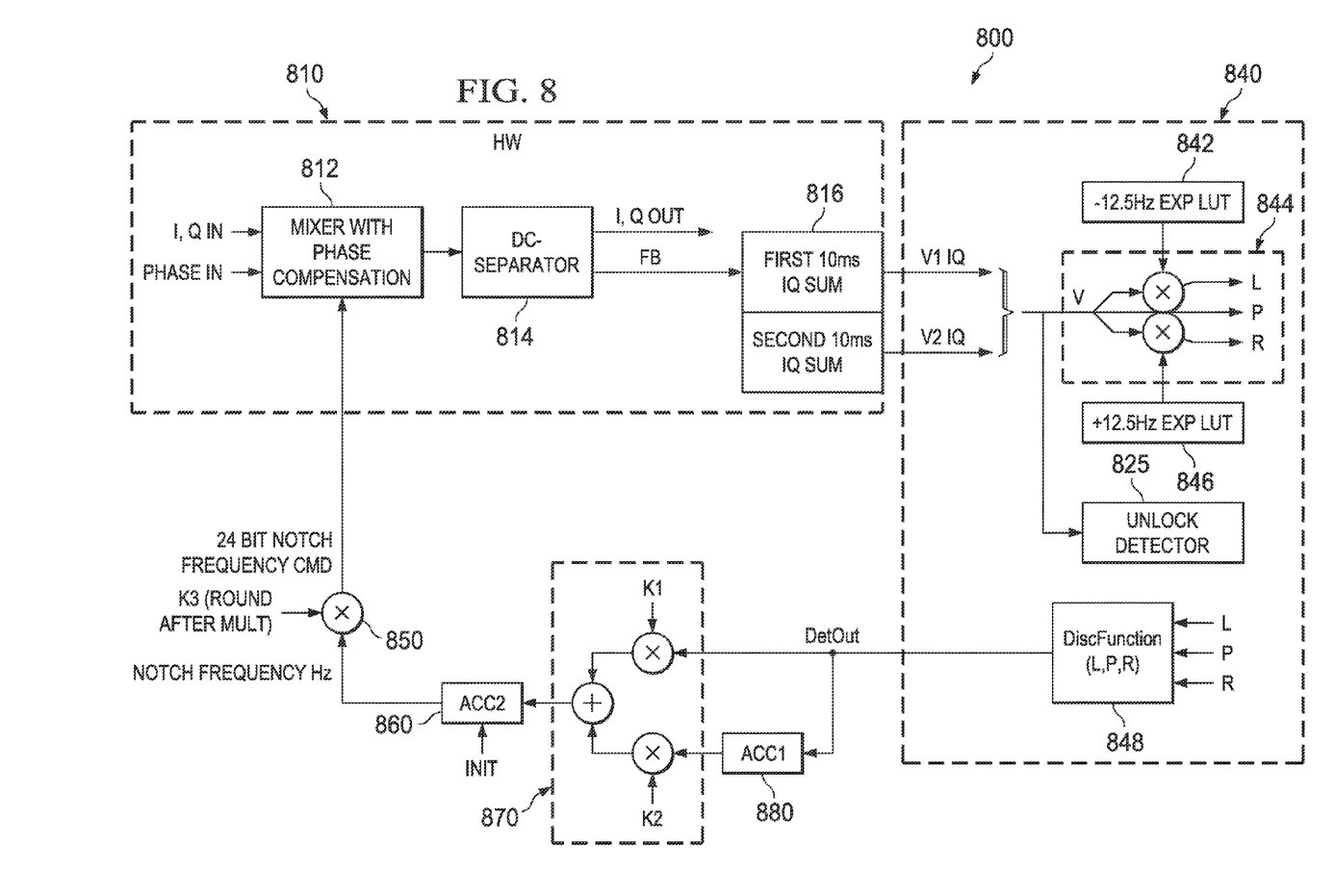
FIG. 8 is a block diagram of an example embodiment of the mitigation core of FIG. 3.

FIG. 7 provides graph 700 of the feedback vs. the input response of the DC separator. The non-spur frequency components are suppressed before being sent to the frequency detector part of the frequency lock loop, when compared to the spur, which is not suppressed. This makes the quality of spur frequency estimated by the frequency lock loop more accurate as the frequency detector is presented with a more accurate version of the current error in spur frequency with minimal corruption by other frequency components, which have been suppressed.

sponding to $1^{st}$ and $2^{nd}$ 10 ms durations of the latest 20 ms period are handed off from detector 810 to discriminator 840. V1 and V2 are each IQ samples (containing V1i, V1q and V2i, V2q).

Table 1 relates example computations made in discriminator 840:

TABLE 1

| Dscrm 840 reads values from det 810 at this time | Values read from det 810 | Phase of +12.5 Hz exp in degrees | Cos | Sin | Computation of L (IQ) = I + jQ | Computation of P (IQ) = I + jQ | Computation of R (IQ) = I + jQ |
|---|---|---|---|---|---|---|---|
| 20 ms | V1 | 0 | 1 | 0 | A = (V1i + jV1q) * (cos − jSin) | C = V1 | E = (V1i + jV1q) * (cos + jSin) |
|  | V2 | 45 | .707 | .707 | B = (V2i + jV2q) * (cos − jSin) | D = V2 | F = (V2i + jV2q) * (cos + jSin) |
|  |  |  |  |  | L = A + B | P = C + D | R = E + F |
| 40 ms | V1 | 90 | 0 | 1 | A = (V1i + jV1q) * (cos − jSin) | C = V1 | E = (V1i + jV1q) * (cos + jSin) |
|  | V2 | 135 | −.707 | .707 | B = (V2i + jV2q) * (cos − jSin) | D = V2 | F = (V2i + jV2q) * (cos + jSin) |
|  |  |  |  |  | L = A + B | P = C + D | R = E + F |
| 60 ms | V1 | 180 | −1 | 0 | A = (V1i + jV1q) * (cos − jSin) | C = V1 | E = (V1i + jV1q) * (cos + jSin) |
|  | V2 | 225 | −.707 | −.707 | B = (V2i + jV2q) * (cos − jSin) | D = V2 | F = (V2i + jV2q) * (cos + jSin) |
|  |  |  |  |  | L = A + B | P = C + D | R = E + F |
| 80 ms | V1 | 270 | 0 | −1 | A = (V1i + jV1q) * (cos − jSin) | C = V1 | E = (V1i + jV1q) * (cos + jSin) |
|  | V2 | 315 | .707 | −.707 | B = (V2i + jV2q) * (cos − jSin) | D = V2 | F = (V2i + jV2q) * (cos + jSin) |
|  |  |  |  |  | L = A + B | P = C + D | R = E + F |

The * in Table 1 is complex multiplication as defined by (A + jB)*(C + jD) = (AC − BD) + j(AD + BC). {L, P, R} are complex IQ samples obtained every 20 ms in this example implementation.

FIG. 8 provides system 800 of an example implementation of a mitigation core detailing spur frequency tracking and its implementation. System 800 includes detector 810 and discriminator 840. Detector 810 includes mixer 812 (mixer 312 of FIG. 3), DC separator 814 DC separator 314 of FIG. 3), and summing unit 816. DC separator 814 receives the I,Q input and separates a residual frequency error signal, which is summed in summing unit 816. In an example implementation, the residual frequency error signal is summed in 10 ms blocks. The output of summing unit 816 is then sent to discriminator 840.

An example embodiment of discriminator 840 includes multiplier 844, unlock detector 825, and discriminator block 848. In order to implement an early-late FLL, which takes in-phase and quadrature data and estimates the phase error, is implemented. The early-late FLL multiplies the output signals from summing unit 816 by a value from look up table (LUT) 842 and a value from LUT 846. In an example implementation, the outputs are multiplied by {1, −12.5 Hz discrete complex exponential, +12.5 Hz discrete complex exponential} to form {Left, Prompt, Right} or {L, P, R}. The exponential is considered quantized in time (to 10 ms in this example implementation). Discriminator block 848 then determines the frequency error between the actual spur frequency and the spur frequency previously estimated by the loop filter, that is, the output of accumulator 860, and outputs a value proportional to the frequency error. Successive outputs of discriminator block 848 are accumulated in accumulator 880, conditioned in conditioning block 870, accumulated in accumulator 860 and amplified in multiplier 850.

In an example embodiment, accumulator 880 and 860 are digital accumulators. In this example implementation, detector 810 computes the ms block coherent sums of the residual frequency error signal (FB). Every 20 ms, V1 and V2 corre- In an example embodiment, multiple modes may be implemented, such as absolute mode and square mode. If absolute mode is selected for implementation in discriminator 840, then the discriminator function, DiscFunction (L, P, R) returns: $[sqrt(Li^2+Lq^2)-sqrt(Ri^2+Rq^2)]/[sqrt(Pi^2+Pq^2)]$ and Kdisc=0.031 should be used when determining the values of K1 and K2 in attenuator 870. If square mode is selected for implementation in discriminator 840, then the discriminator function, DiscFunction (L, P, R) returns: $[(Li^2+Lq^2)-(Ri^2+Rq^2)]/[(Pi^2+Pq^2)]$ and Kdisc=0.0583 should be used. The scale factor Kdiscmay be chosen to result in an output of 1 for 1 Hz frequency error.

In an example implementation, the values of K1 and K2 used in attenuator 870 may be determined by the following calculations:

B=BW3 dB=2 Hz, which represents the 3 dB bandwidth of the FLL. This may be programmed to different values depending on the properties of the spurs expected in a particular application such as, for example, how fast the frequencies are expected to move.

D=Damping factor=1

Fr=50 Hz(with 20 ms loop reference or update rate)

$Wn = Natural\ Frequency = 2*\pi*B/[sqrt(1+2D^2+sqrt(4*D^4+4*D^2+2))] = about\ 5.388$ Kd=Kdisc=Discriminator gain $K1 = 2*D*Wn/[Fr*Kd]$ $K2 = Wn*Wn/[Fr*Fr*Kd]$ For absolute mode discriminator, this comes to:
K1=6.94
K2=0.374
Fs=16 .MHz
K3=$(2^{24})$/Fs In an example implementation, the value is rounded and the most significant 24 integer bits are used.

Figure 9:
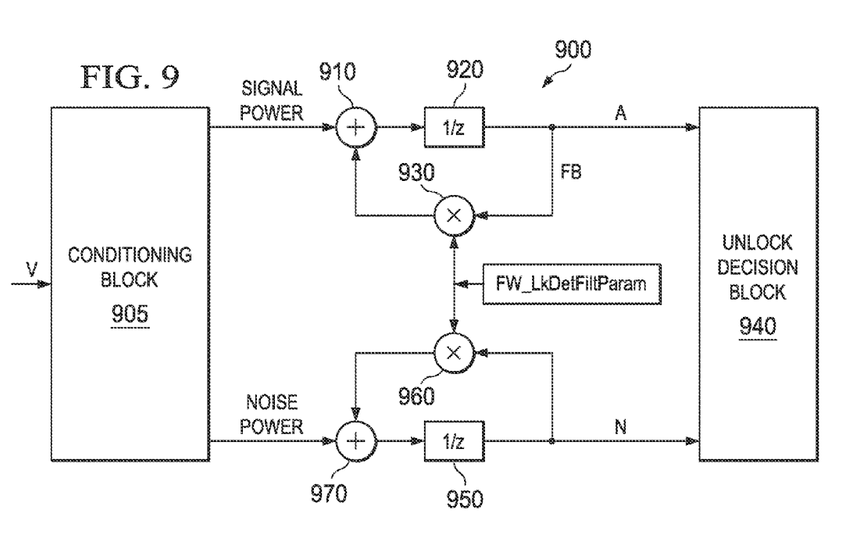
FIG. 9 is a block diagram of an example embodiment of the unlock detector of FIG. 8.

FIG. 9 provides example embodiment 900 of unlock detector 825 of FIG. 8 for determining whether the spur frequency is locked. Substantially identical filters may be used for both signal power and noise power estimates. In an example implementation, let V1 and V2 be the complex IQ samples output by summing unit 816 every 20 ms, for example. The power level of the spur signal and noise may be calculated in conditioning block 905 as:

$P10_{pow} = (V1i^2 + V1q^2 + V2i^2 + V2q^2)/2$ $P = V1 + V2$ $P20_{POW} = (Pi^2 + Pq^2)$ Signal Power $= (P20_{POW} - 2*P10_{POW})/2$ Noise Power $= (4*P10_{POW} - P20_{POW})/2$ The signal power signal and noise power signal may then be passed through substantially identical filters shown in embodiment 900 to smooth out instantaneous errors in the signal and noise energy measurements and to average the calculations. Next, AbyN (Signal Power/Noise Power) is calculated as the output of the filtered signal power signal divided by the filtered noise power signal. After a time period to allow for settling after spur tracking is initiated (for example, 1 second), in unlock decision block 940, check regularly (for example, every 200 ms) to determine if AbyN is less than 2, for example. If AbyN is less than 2, the spur strength is determined to be low and updates to accumulator 860 and accumulator 880 may be stopped until AbyN rises above 2. If, after a number of intervals, AbyN remains below 2, the mitigation core may be bypassed, freeing up the mitigation core to be used for tracking a newly discovered spur. The signal power filter includes adder 910, filter block 920 and filter parameter multiplier 930. The lock detect filter parameter may be set to 15/16 in an example implementation to achieve the following specs:

Noise equivalent $BW = (1-p)/4 = 0.8$ Hz $-3$ dB $BW = (1-p)/2\pi = 0.5$ Hz

Time constant $= 1/(2\pi B3$ dB$) = 320$ ms.

Adder 910 adds the feedback from low pass filter 920 which is multiplied by the lock detect filter parameter in multiplier 930. The output of adder 910 is filtered by low pass filter 920. The noise power filter includes adder 970, filter block 950 and filter parameter multiplier 960. As with the signal power filter, the lock detect filter parameter may be set to 15/16 in an example implementation to achieve the following specs:

Noise equivalent $BW = (1-p)/4 = 0.8$ Hz $-3$ dB $BW = (1-p)/2\pi = 0.5$ Hz

Time constant $= 1/(2\pi B3$ dB$) = 320$ ms.

Adder 970 adds the feedback from low pass filter 950 which is multiplied by the lock detect filter parameter in multiplier 960. The output of adder 970 is filtered by low pass filter 950.

Figure 10:
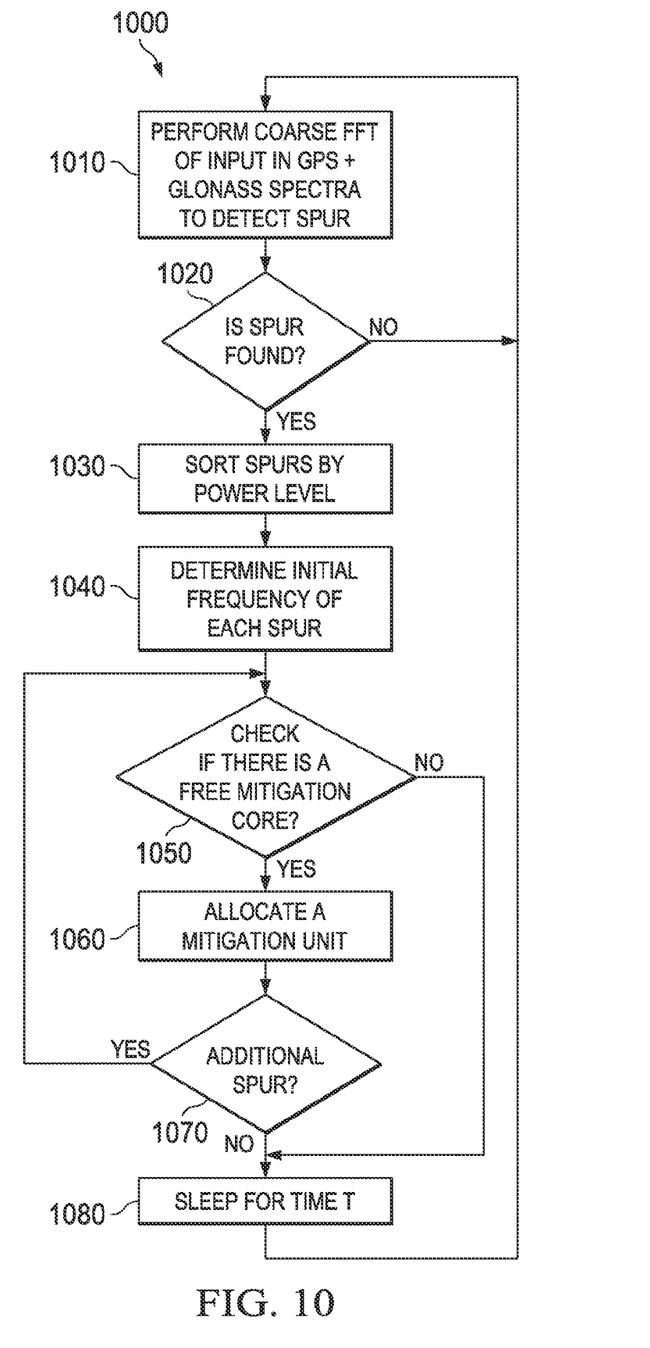
FIG. 10 is a flow diagram of an example embodiment of a method of dynamic spur mitigation for wireless receivers.

FIG. 10 provides flow chart 1000 of an example embodiment of a method of dynamic spur mitigation for wireless receivers. In block 1010, a coarse FFT is performed on the input in at least one of a GPS and GLONASS spectra to detect a spurious tone. A determination of whether a spur is found is made in block 1020. If a spur is not found, then block 1010 is repeated. If one or more spurs is found, then the spurs are sorted by power level in block 1020. In an example embodiment, the spur with the highest power level is filtered first. In block 1040, the initial frequency of each spur is determined. An FFT output for each spur may be decimated and interpolated to obtain a more accurate spur frequency.

In block 1050, a determination is made as to whether there is a free mitigation core. If there is not a free mitigation core, then in block 1080, the process goes to sleep for a time T. In an example embodiment, T is programmable. In an example embodiment, if the frequency of the new spur is substantially the same as a spur that is already being mitigated by one of the mitigation cores (for example, it was found in earlier iterations and a mitigation core was already allocated to mitigate it), then the process skips the mitigation step in block 1060 and proceeds to block 1070 to determine if there are additional spurs to mitigate. If the spur is a new spur, then in block 1060 a mitigation unit top is allocated to mitigate the spur. In block 1070, a determination is made as to whether an additional spur is to be mitigated. If no more spurs are present, in block 1080, the process goes to sleep for a time T, and the process returns to block 1010. If an additional spur is present, the process returns to block 1050.

Although the present disclosure has been described in detail, it should be understood that various changes, substitutions and alterations can be made thereto without departing from the spirit and scope of the disclosure as defined by the appended claims.

Therefore, at least the following is claimed:
1. A wireless radio receiver comprising:
    a plurality of mitigation modules, each mitigation module configured to track the frequency of a spurious tone, the spurious tone being of at least one of a static frequency or dynamically drifting frequency, and to suppress the spurious tone
    each mitigation module including a mixer with phase compensation, the mixer configured to receive a complex input signal and phase rotation information from a previous stage, to remove the phase rotation from the previous stage, to impart a second phase rotation on the signal to move a second spurious tone to substantially zero Hz, and to send second phase rotation information to a subsequent stage;
    in which each mitigation module includes a DC separator configured to split the output of the mixer into a DC component and a non-DC component and to send out the non-DC component as the complex signal output; a frequency detector configured to detect and output the frequency of the DC component; and a frequency lock loop (FLL) filter configured to filter an output of the frequency detector and to drive the mixer with phase compensation to force the drifting frequency of the DC component to substantially zero Hz.

* * * * *